UNITED STATES PATENT OFFICE.

WILLY BARINGER, OF BERLIN, GERMANY.

PROCESS OF RENDERING MANILA COPAL, &c., INSOLUBLE IN OIL.

No. 854,071. Specification of Letters Patent. Patented May 21, 1907.

Application filed February 15, 1906. Serial No. 301,324.

*To all whom it may concern:*

Be it known that I, WILLY BARINGER, a citizen of the Empire of Germany, residing at Berlin, Altonaerstrasse 17, in the Empire of Germany, have invented a new and useful process for rendering Manila copal, sandarac, and like resinous substances insoluble in oil and especially suitable for use in the preparation of polishes, of which the following is a specification.

My invention relates to a method of preparation of polishes from Manila copal, sandarac and similar resinous substances. The attempts already made to employ such resins in place of the more expensive shellacs have invariably resulted in failure in consequence of the fact that these resins even at ordinary temperatures combine with the oil of the polishes to form a greasy and sticky mass, for which reason it is not possible to distribute them over the surface to be polished as evenly as an alcoholic solution of shellac can be distributed with the help of a little oil. By means of the process to which this invention relates, the above mentioned resins are rendered insoluble in oil, whereby they become suitable for the purpose in question since they then act similarly to shellac and do not require more oil than shellac in polishing.

The process consists in intimately mixing Manila copal, sandarac and other resins, which dissolve in alcohol, with from 1 to 5 % of a fatty oil, heating the mixture slowly until it becomes viscous and keeping the viscous substance for from $\frac{1}{2}$ to one hour in this condition while constantly stirring it. Especially drying oils have been found suitable for the purpose, the temperature to which the mass is to be heated being about 200° C.

It may also be stated that the important fact that Manila copal, sandarac and similar resins can, by means of the process described, be rendered insoluble in oil has hitherto been unknown.

What I claim as my invention, and desire to secure by Letters Patent, is—

A process for rendering Manila copal, sandarac and similar resins insoluble in oil, consisting in intimately mixing the resin which must be soluble in alcohol with 1 to 5 % of a fatty oil, and then slowly heating the mixture to a temperature at which it becomes viscous, the mass being maintained at this temperature from one half to one hour, substantially as and for the purpose herein set forth.

In testimony whereof I affix my signature.

WILLY BARINGER.

In the presence of—
HENRY HASPER,
WOLDEMAR HAUPT.